United States Patent [19]
Koczarski et al.

[11] Patent Number: 5,915,896
[45] Date of Patent: Jun. 29, 1999

[54] ADJUSTABLE MACHINE TOOL ASSEMBLY

[75] Inventors: Jack B. Koczarski, Trumbull; Joseph E. Merola, East Haven, both of Conn.

[73] Assignee: Sikorsky Aircraft Corp., Stratford, Conn.

[21] Appl. No.: 09/152,318

[22] Filed: Sep. 14, 1998

[51] Int. Cl.⁶ .................................................. B23B 31/36
[52] U.S. Cl. ........................... 409/131; 279/42; 279/133; 408/153; 408/239 R; 409/232
[58] Field of Search ..................... 409/131, 232, 409/234; 408/153, 154, 156, 239 R; 279/42, 43, 48, 52, 53, 103, 132, 133

[56] References Cited

U.S. PATENT DOCUMENTS

| | | | |
|---|---|---|---|
| 3,041,898 | 7/1962 | Better | 409/234 |
| 4,218,068 | 8/1980 | Lutz et al. | 408/156 |
| 4,776,734 | 10/1988 | Buettiker et al. | 409/234 |
| 5,286,042 | 2/1994 | Laube | 408/156 |
| 5,427,484 | 6/1995 | Galli | 409/234 |
| 5,533,847 | 7/1996 | Basteck | 409/234 |
| 5,593,258 | 1/1997 | Matsumoto et al. | 408/239 R |
| 5,601,295 | 2/1997 | Baker | 279/133 |

FOREIGN PATENT DOCUMENTS 592694  4/1994  European Pat. Off. ............... 409/232

*Primary Examiner*—Daniel W. Howell
*Attorney, Agent, or Firm*—William W. Jones

[57] ABSTRACT

High speed machining of parts is greatly enhanced when the axial alignment between the machining tool, its tool holder assembly, and a tool driver assembly can be precisely maintained, preferably within about one ten thousandths of an inch, in order to achieve the utmost in machining precision in the parts being machined. In order to maintain this desired degree of alignment, the machining tool is mounted in an angularly adjustable holder assembly which mates with a complementary socket that forms a part of the tool driver assembly. The tool holder assembly can also be used to move the tool radially sideways in a rectilinear fashion relative to the tool driver assembly, if desired. The tool holder assembly, besides being able to adjust the alignment of the tool relative to the tool driver assembly, is also operative to securely clamp the tool to the tool driver assembly.

15 Claims, 2 Drawing Sheets

ADJUSTABLE MACHINE TOOL ASSEMBLY

TECHNICAL FIELD

This invention relates to an improved machine tool assembly for use in connection with high speed machining of metal or other material parts, and more particularly to a machine tool assembly which enables adjustment of a cutter part of the assembly so as to ensure that the cutter and a drive spindle part of the assembly are in alignment with each other. The assembly also allows the cutter part to be shifted laterally to some extent relative to the drive spindle part to provide the necessary alignment.

BACKGROUND ART

High speed machining of metal parts is a newly emerging technology which allows accurate and high speed manufacture of milled and drilled parts. This technology can be used to eliminate riveted sheet metal assemblies, for example. In high speed machining, the machine spindle and cutter are rotated at speeds of twenty five thousand RPM, or greater. To achieve high precision, the cutters are mounted in the machine spindle by means of short taper holders or holders.

One way of mounting a cutter in the holder is to heat the holder to temperatures of about 750° F. so as to expand the inside diameter of the holder. The cutter shank is then inserted into the holder and the latter is cooled so as to shrink fit the holder onto the cutter shank. The holder and cutter are then mounted on the machine tool spindle. This procedure is not desirable due to the fact that it requires a very precise cutter shank and holder axis alignment at the time of cutter-to-holder insertion; and, in addition, tools which are mounted in this fashion do not have a very extensive useful life due to the fact that the tool holder is heated and then cooled which causes deterioration of the tool holder material.

Another way to connect the cutter to the spindle is the use of a spindle that has a split holder inside of it. The cutter shank is inserted into the holder and a collar on the spindle is twisted so as to radially squeeze the holder onto the cutter shank.

A third way to mount the cutter in the spindle includes a set screw which is threaded into the side of the spindle and which is tightened down onto the cutter shank after the latter has been inserted into the spindle.

In each of the aforesaid mounted schemes, there is no way to adjust the cutter axis so as to ensure that the cutter and the spindle are aligned after the cutter has been mounted in the spindle. Cutter-spindle misalignment results in erratically machined parts, surface finish imperfections, and tool imbalance. Users of high speed machining have no solution to the problem of cutter-spindle misalignment, and therefore it is presently merely tolerated. It would be highly desirable to provide a solution to the aforesaid cutter-spindle alignment, or misalignment if you will, problem.

DISCLOSURE OF THE INVENTION

This invention relates to a high speed machining cutter mounting assembly for use in attaching the cutter to a machine spindle. More particularly, this invention relates to a mounting assembly of the character described wherein extant misalignments between the cutter axis and the spindle axis can be eliminated after the cutter has been attached to the spindle. The mounting assembly preferably includes a split cutter shank-engaging holder which has an inner cylindrical bore for receiving the cutter shank, and an outer surface which is capable of being pivoted within the machine spindle. The machine spindle has a complementary socket for receiving the holder.

The assembly includes a plurality of axially extending securement and torquing bolts which, when tightened down, cause the holder to clamp about the cutter shank; and can also be selectively tightened and loosened so as to pivot the holder within the spindle socket, whereby the cutter axis can be made coincidental with the spindle axis. Misalignments between the cutter axis and the spindle axis of up to about 0.003 inch, and as small as about 0.0001 inch, can be corrected by appropriate manipulation of the preferred embodiment of this invention. The cutter axis can also be shifted laterally in the spindle by manipulating the torquing bolts in an appropriate manner so as to alleviate any extant tool-spindle radial misalignments.

It is therefore an object of this invention to provide an improved assembly for mounting a high speed machining cutter tool to a machine spindle.

It is an additional object of this invention to provide an assembly of the character described which allows for the correction of misalignments between the axis of the cutter tool and the axis of the spindle in order to establish alignment between the aforesaid axes.

It is a further object of this invention to provide an assembly of the character described which allows parallel lateral shifting of the axis of the cutter tool relative to the axis of the spindle in order to alleviate any extant tool-spindle radial misalignments.

BRIEF DESCRIPTION OF THE DRAWINGS

These and other objects and advantages of the invention will become more readily apparent from the following detailed description of an embodiment of the invention when taken in conjunction with the accompanying drawings in which.

BEST MODE FOR CARRYING OUT THE INVENTION

Figure 4:
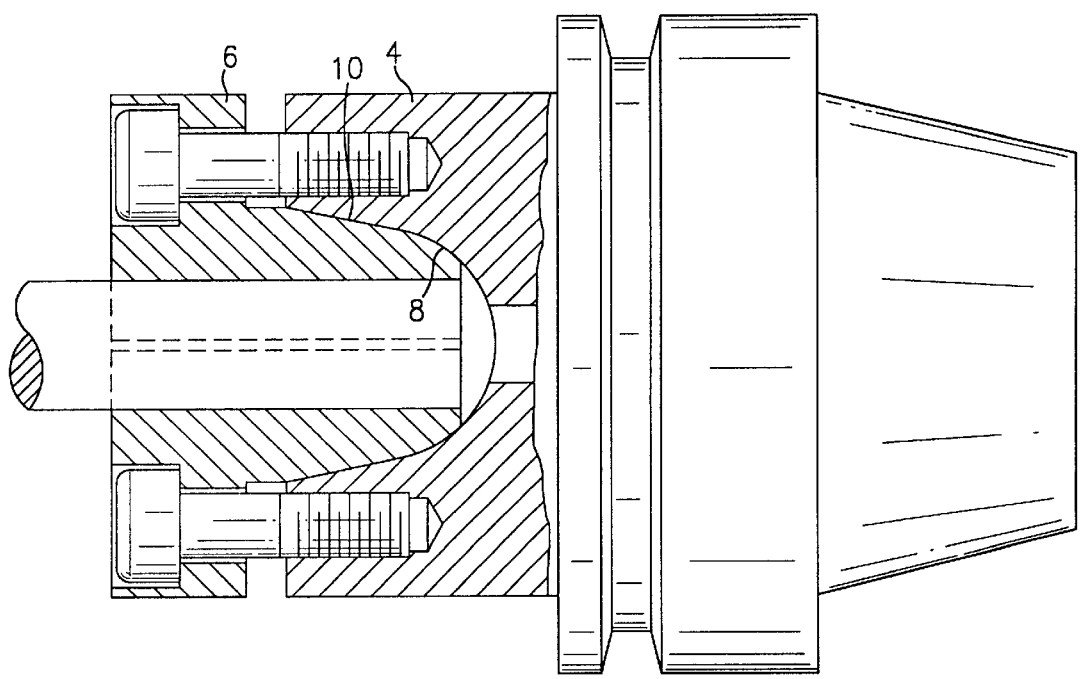
FIG. 4 is a sectional view similar to FIG. 2, but showing an alternative embodiment of the socket portion of the adjustable mounting assembly of this invention.

Referring to the drawings, the machining assembly is denoted generally by the numeral 2, and includes a spindle 4 and a holder 6 which is operatively connected to the spindle 4. The spindle 4 is provided with a tapered recess 8, which is essentially conical in the embodiment shown in FIG. 2 and is essentially ogival in the embodiment shown in FIG. 4. The holder 6 is provided with a tapered outer surface 10 which is configured so as to match the taper of the recess 8 whereby the surface 10 and recess 8 form a joint between the holder 6 and the spindle 4; and the holder 6 is also provided with a cylindrical bore 12 which receives the shank of a cutter tool 14. The holder 6 includes a slot 16 which is preferably about 0.040 inch wide, and which enables the holder 6 to be flexed inwardly and outwardly. Tightening bolts 18 and 18' are operable to secure the holder 6 to the spindle 4. The bolts 18 are disposed on one side of the slot 16 and the bolts 18' are disposed on the opposite side of the slot 16. The bolts 18 and 18' are threaded into the spindle 4, and when tightened down on the spindle 4, they will force the holder surface 10 into the spindle recess 8 thereby causing the slot 16 to become narrower to some extent. Narrowing of the slot 16 causes the holder 6 to contract about the cutter shank 14 thereby locking the cutter shank 14 to the holder 6. In effect, the holder 6 and the cutter shank 14 thus become a unitary part of the high speed machining assembly 2.

Figure 1:
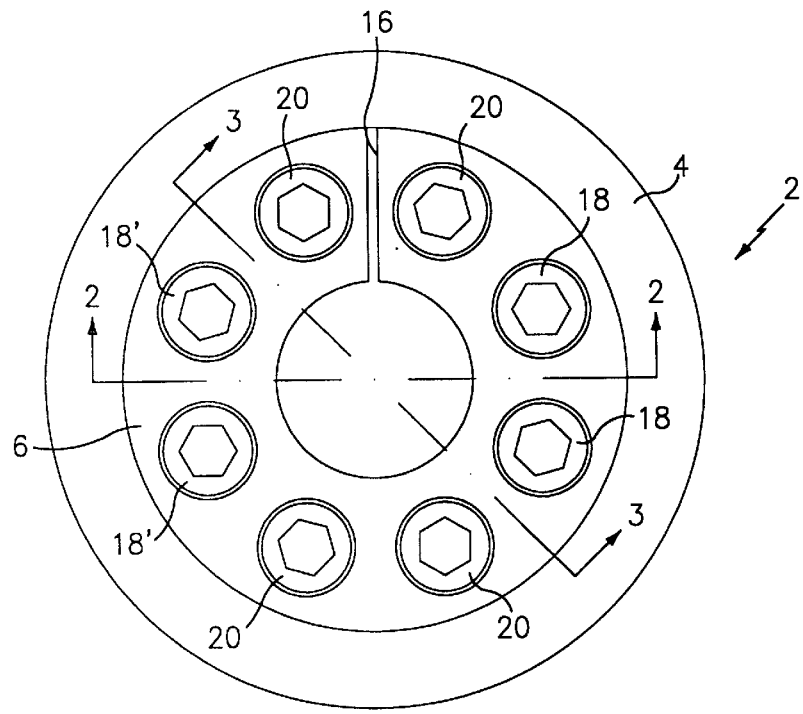
FIG. 1 is an end elevational view of an embodiment of an adjustable cutter tool mounting assembly which is formed in accordance with this invention.
Figure 3:
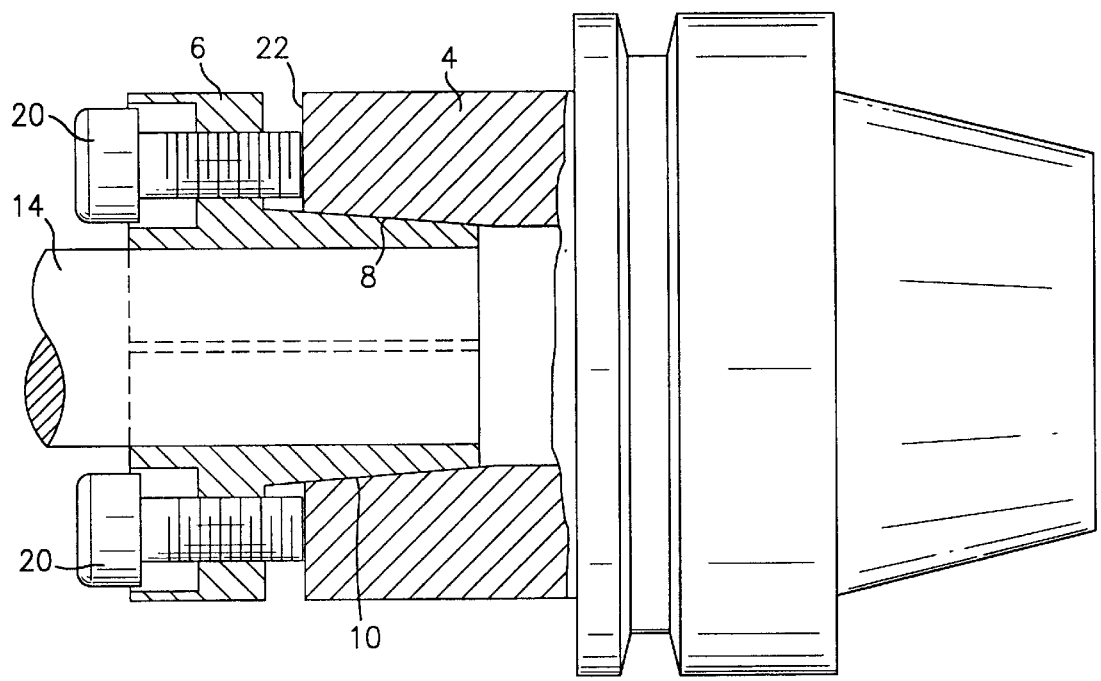
FIG. 3 is a sectional view of the cutter mounting assembly taken along line 3—3 of FIG. 1.

Referring particularly to FIGS. 1 and 3, there are a plurality of loosening bolts 20 which are threaded into the holder 6 and which are operable to engage a surface 22 on the spindle 4. In order to release the cutter shank 14 from the holder 6, the bolts 18 and 18' are loosened, and the bolts 20 are screwed into the holder 6 so as to push against the spindle surface 22. This pushing action causes the tapered surfaces 8 and 10 to separate from each other thereby releasing the pressure of the holder 6 on the tool shank 14. Once the holder pressure is released, the cutter shank 14 can be withdrawn from the holder 6.

Figure 2:
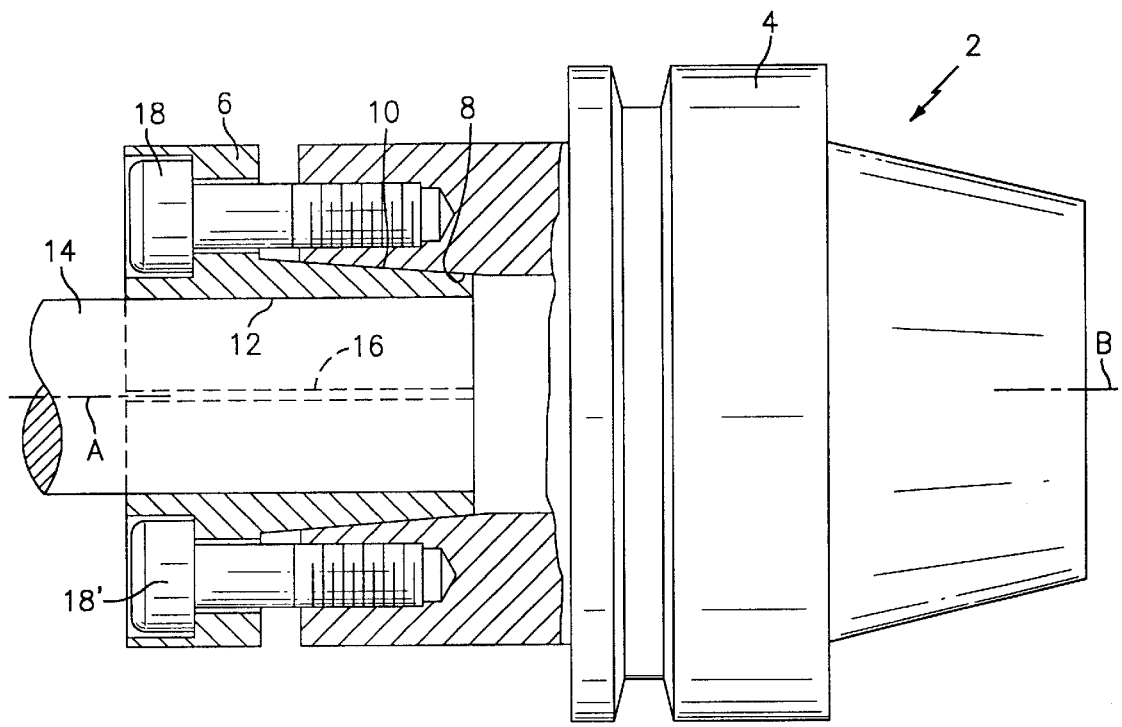
FIG. 2 is a sectional view of the cutter mounting assembly taken along line 2—2 of FIG. 1.

When the cutter shank 14 (and thus the cutter tool) and the holder 6 are securely mounted in the spindle 4, the central axis of symmetry of both the cutter 14 and the holder 6, which is designated by the letter A in FIG. 2, will become coincidental since the holder 6 will have become clamped down onto the cutter shank 14. The central axis of symmetry of the spindle 4 is designated by the letter B in FIG. 2. As noted above, it is important that the axes A and B be aligned or coincidental in order for the high speed machining tool to operate properly.

In some cases, when the cutter 14 is mounted in the assembly 2, the axes A and B will be coincidental, but in other cases they will not. In the latter such cases, the assembly 2 can be adjusted as follows so as to correct the misalignment of the axes A and B. In order to determine the presence or absence of axial misalignment, the attached cutter and spindle assembly 2 can be placed in a fixture and inspected by means of either dial gauges, or by a shadow profilometer. Either means of inspection will reveal axial misalignment. If misalignment is detected, the bolts 18 and 18' can be selectively adjusted by increasing bolt torque on the holder 6 and/or decreasing the bolt torque. In general, the bolts 18 act against the bolts 18' during the axial alignment process so as to assymetrically compress the slot 16. The tapered surfaces 8 and 10 function to allow the holder 6 to pivot relative to the spindle 4 when the bolts 18 and 18' are selectively tightened and/or loosened. The provision of the slot 16 enables the holder 6 to pivot or twist in the spindle 4 by reason of the aforesaid joint when appropriately torqued by the bolts 18 and 18'. The magnitude of alignment correction is usually small, as noted above, and the maximum alignment correction necessary is usually no more than about 0.003 inch. The provision of the slot 16 in the holder 6 allows the realignment of the holder 6 and the spindle 4 when misalignment is detected, and the provision of the bolts 18 and 18' provides the torquing forces needed to correct axial misalignment. The differences in the bolt torquing forces needed to properly align misaligned cutter and spindle axes can be as small as one foot pound of torque between the bolts 18 and 18'. In order to achieve the aforesaid torquing differential, a torque-indicating wrench can be used.

The bolts 18 and 18' can also be used to shift the cutter axis A laterally of the spindle axis B in order to eliminate any extant radial cutter-spindle misalignment. The bolts 18, 18' and 20 are all provided with hexagonal recesses for engagement by a torquing wrench.

It will be readily appreciated that the assembly of this invention can be used to properly align a high speed machine cutting tool, such as a milling tool, with the machine spindle that rotates the cutting tool so as to correct any axial and radial eccentricities which may be present when the cutting tool is initially affixed to the machine tool spindle. As a result, work surface damage which results from eccentricities between the cutting tool and the machine tool spindle can be eliminated.

Since many changes and variations of the disclosed embodiment of this invention may be made without departing from the inventive concept, it is not intended to limit the invention otherwise than as required by the appended claims.

What is claimed is:

1. A high speed machine tool assembly comprising:
   a) a drive spindle, said drive spindle including a tapered recess which is oriented about a drive spindle axis of rotation;
   b) a cutter tool having a shank which defines a cutter tool axis of rotation;
   c) a cutter tool holder having a recess which complements said cutter tool shank, said cutter tool holder having an outer tapered surface which complements the taper of said drive spindle recess; and said cutter tool holder including an open ended slot which extends from one end of said cutter tool holder to an opposite end thereof; and
   d) selectively adjustable mechanisms which are operable to tighten said cutter tool holder against said drive spindle in a manner which will cause said cutter tool holder to grip said cutter tool shank by compressing said cutter tool holder slot, said mechanisms also being operable, when properly manipulated, to correct any extant misalignment between said axes of rotation so as to align said axes of rotation.

2. The high speed machine tool assembly of claim 1 wherein said adjustable mechanisms are operable, when correcting axes of rotation misalignment, to apply forces to said cutter tool holder which forces are operable to compress said cutter tool holder slot from only one side of said slot so as to cause said cutter tool holder to pivot in said drive spindle tapered recess so as to align said axes of rotation.

3. The high speed machine tool assembly of claim 2 wherein said cutter tool holder includes a flange which faces a surface on said drive spindle, and wherein said adjustable mechanisms comprise bolts disposed on opposite sides of said cutter tool holder slot, which bolts bear against said flange and are threaded into said drive spindle surface.

4. The high speed machine tool assembly of claim 2 wherein said drive spindle tapered recess is generally conical in configuration.

5. The high speed machine tool assembly of claim 2 wherein said drive spindle tapered recess is generally ogival in configuration.

6. The high speed machine tool assembly of claim 1 wherein said adjustable mechanisms are operable, when correcting axes eccentricities, to apply forces to said cutter tool holder which are operable to compress said cutter tool holder slot from one side of said slot so as to cause said cutter tool holder to move laterally in said drive spindle tapered recess so as to correct radial misalignments of said axes.

7. The high speed machine tool assembly of claim 3 further comprising a plurality of adjustable disengaging mechanisms which are mounted on said cutter tool holder, said disengaging mechanisms engaging said drive spindle surface, and said disengaging mechanisms being operable, when properly manipulated, to move against said drive spindle surface and force said cutter tool holder away from said spindle so as to disengage said tapered surface from said tapered recess.

8. The high speed machine tool assembly of claim 7 wherein said disengaging mechanisms are bolts which are threaded into said cutter tool holder.

9. A high speed machine tool assembly comprising:
   a) a drive spindle, said drive spindle including a tapered joint component which is oriented about a drive spindle axis of rotation;
   b) a cutter tool having a shank which defines a cutter tool axis of rotation;
   c) a cutter tool holder having a recess which complements said cutter tool shank, said cutter tool holder having a tapered joint component which complements the taper of said drive spindle joint component; and said cutter tool holder including an open ended slot which extends from one end of said cutter tool holder to an opposite end thereof; and
   d) selectively adjustable mechanisms which are operable to tighten said cutter tool holder against said drive spindle in a manner which will cause said cutter tool holder to grip said cutter tool shank by compressing said cutter tool holder slot, said mechanisms also being operable, when properly manipulated, to correct any extant misalignment between said axes of rotation so as to align said axes of rotation.

10. The high speed machine tool assembly of claim 9 wherein said adjustable mechanisms are operable, when correcting axes of rotation misalignment, to apply forces to said cutter tool holder which forces are operable to compress said cutter tool holder slot from only one side of said slot so as to cause said cutter tool holder joint component to move relative to said drive spindle joint component in a manner which will align said axes of rotation.

11. A method for aligning axes of rotation of a cutter tool holder and a cutter tool drive spindle in a high speed machine tool assembly, said method comprising the steps of:
   a) providing an adjustable joint between said cutter tool holder and said cutter tool drive spindle whereby misalignment of the cutter tool axis and the spindle axis can be corrected through manipulation of said joint;
   c) providing said cutter tool holder with an open ended slot which extends from one end of said cutter tool holder to an opposite end thereof; and
   d) selectively tightening said cutter tool holder against said drive spindle in a manner which will cause said cutter tool holder to grip said cutter tool shank by compressing said cutter tool holder slot and will also cause movement in said joint so as to eliminate any extant misalignment between said axes of rotation so as to align said axes of rotation.

12. The method of claim 11 wherein said step of selectively tightening is performed by applying forces to said cutter tool holder which forces are operable to compress said cutter tool holder slot from only one side of said slot so as to cause said cutter tool holder to shift in said joint relative to drive spindle.

13. The method of claim 11 wherein said joint includes a tapered recess on one of said cutter tool holder and said spindle, and a complementary tapered boss on the other of said cutter holder and spindle.

14. The method of claim 13 wherein said tapered recess is generally conical in configuration.

15. The method of claim 14 wherein said tapered recess is generally ogival in configuration.

* * * * *